United States Patent [19]

Chun et al.

[11] Patent Number: 5,065,918

[45] Date of Patent: Nov. 19, 1991

[54] FILM CASE HOLDER FOR POCKET CAMERA

[76] Inventors: Byoung E. Chun, 310-504, Chooggong APT Banpo-dong, Seocho-gu; Nam H. Chun, 177-12, Koosan-dong Eunpyoung-gu; Woo S. Chun, 832-17, Dongmoon-dong Susan-si, Chungcheongnam-do, all of Seoul, Rep. of Korea

[21] Appl. No.: 487,000

[22] Filed: Mar. 1, 1990

[30] Foreign Application Priority Data

May 24, 1989 [KR] Rep. of Korea ............... 89-6796[U]

[51] Int. Cl.$^5$ .............................................. A45F 5/00
[52] U.S. Cl. .................................. 224/191; 224/252; 224/247; 190/109; 206/389
[58] Field of Search ............... 224/253, 252, 247, 248, 224/219, 222, 267; 220/85 H; 206/389; 190/109; 24/459, 3 R, 3 L; 354/295, 275

[56] References Cited

U.S. PATENT DOCUMENTS

| | | | |
|---|---|---|---|
| 439,423 | 10/1890 | Potts | 224/248 |
| 470,840 | 3/1892 | Lane | 224/253 |
| 1,032,527 | 7/1912 | Bainum | 248/313 |
| 1,464,659 | 8/1923 | Keely | 224/253 |
| 4,406,385 | 9/1983 | Pribyl | 224/253 |
| 4,708,273 | 11/1987 | Grant | 224/252 |
| 4,781,315 | 11/1988 | Nordskog | 224/253 |
| 4,801,011 | 1/1989 | Desdoigts | 224/253 |

Primary Examiner—Linda J. Sholl
Attorney, Agent, or Firm—Townsend and Townsend

[57] ABSTRACT

A film case holder adapted to be releasably attached to the hand strap of a pocket camera including an elongated holder body having a rear surface recess corresponding in dimensions and adapted to receive the hand strap, a fastener designed to engage with and securely attach the holder body to the hand strap and a resilient support member having a C-shaped cross-section for receiving a film case of a size sufficient to enclose a film cassette.

3 Claims, 2 Drawing Sheets

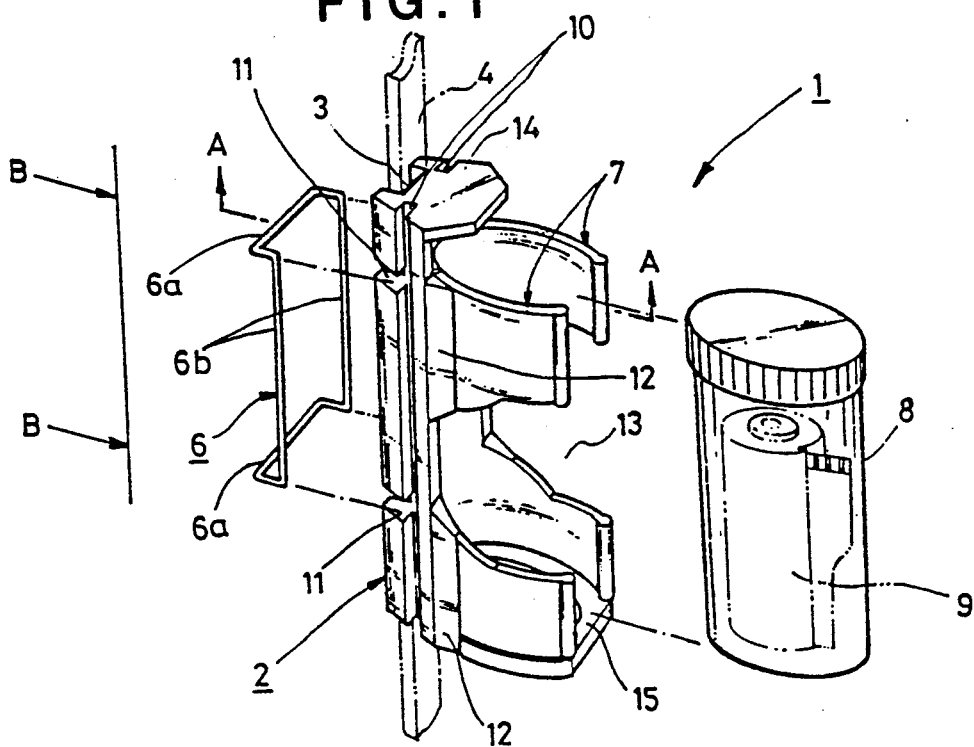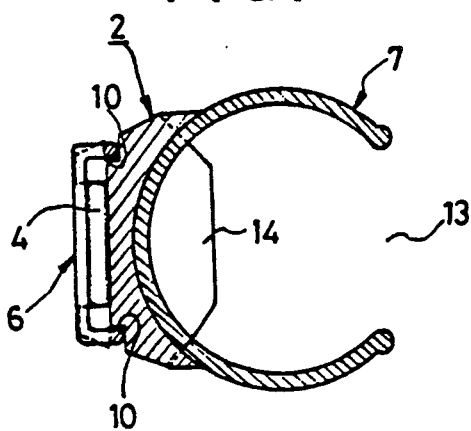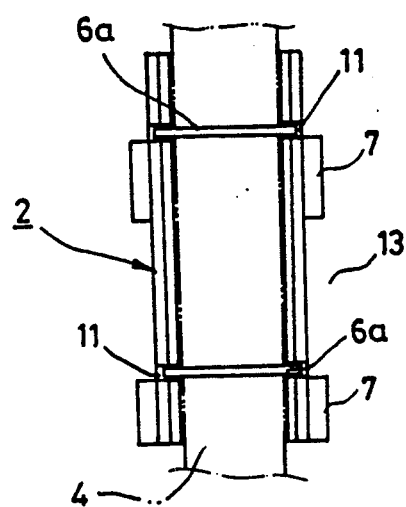

FILM CASE HOLDER FOR POCKET CAMERA

BACKGROUND OF THE INVENTION

This invention relates to a film case holder for pocket camera, and more particularly to a film case holder which can be releasably attached to a hand strap for easy carrying a film cassette.

Generally, when we carry a pocket together with a marginal film cassette or a film cartridge, we may put a film cassette into a film case and deposit the film case or film cassette into a portable bag or a pocket. It is troublesome to find out a film cassette among various materials of the bag therein. Moreover, when we carry a film case in the pocket, the film case protrudes from the outer surface of the pocket, so that it looks bad and has a possibility to be lost whereby resulting inconvenience for handling.

To this end, there is a film case holder, as a prior art, which has a fastening means for connecting the holder with the hand strap, can be releasably attached to the hand strap for receiving a film cassette therein.

But above mentioned prior art has several draw backs in handling. For example, it was burdensome to attach or detach the film case holder from the hand strap because user connect or release the fastening means and then remove the cap of the holder for putting a cassette into or out of the holder. Further, user cannot easily confirm whether a film cassette is received within the holder or not until he removed the cap of the holder.

SUMMARY OF THE INVENTION

It is the principal objective of the present invention to provide a film case holder which can be releasably attached to a hand strap with ease and in a desired number.

It is further the objective of the present invention to provide a film case holder which is simply constructed for ease of carrying a cassette and for easy confirmation whether the cassette is received or not.

To accomplish the above-mentioned objectives, the film case holder in accordance with one embodiment of the present invention comprises a holder body extending longitudinally and having a recess on rear surface for receiving a hand strap, a fastener having leg portions for securely attaching the holder body to the hand strap, and a resilient support member having C-shaped cross section for receiving a film case which receives a film cassette therein and a U-shaped opening on both sides for easy approaching.

The holder body is provided with a pair of side grooves on the side surface and a pair of transverse grooves for receiving leg portions of the fastener so that the holder body can be securely attached to the hand strap. A stopper plate is integrally formed on the upper portion of the holder body toward the support member, and a base plate is tightly fixed to the bottom portion of the holder body to close a lower space of the support member, so that the film case fitted within the support member may not be dropped out.

According to another embodiment of the present invention, the film case holder comprises a box-shaped holder body having an inner space therein, a recess on the rear surface thereof, and a U-shaped opening formed on its upper and lower plate for easy approaching. A resilient support member is tightly fitted within the inner space of the holder body.

When the user intends to attach the film case holder to the hand strap, he inserts the hand strap into the recess and then fits the leg portions of the fastener within both side and transverse grooves. Therefore, the film case holder becomes securely attached to the hand strap.

At this status, he may insert a film case which receives a film cassette therein into the C-shaped support member. Accordingly, the film case is tightly housed within the space of the support member by a resilient force thereof and not to be loosened or dropped out.

BRIEF DESCRIPTION OF THE DRAWINGS

A particular preferred embodiment of the invention will now be described, by way of example, with reference to the accompanying drawings wherein:

FIG. 1 is an exploded perspective view illustrating the film case holder according to a first embodiment of the present invention;

FIG. 2 is a sectional view along the line A—A of FIG. 1 when the fastener is secured;

FIG. 3 is a front view along the line B—B of FIG. 1;

DETAILED DESCRIPTION OF THE DRAWINGS

Figure 4:
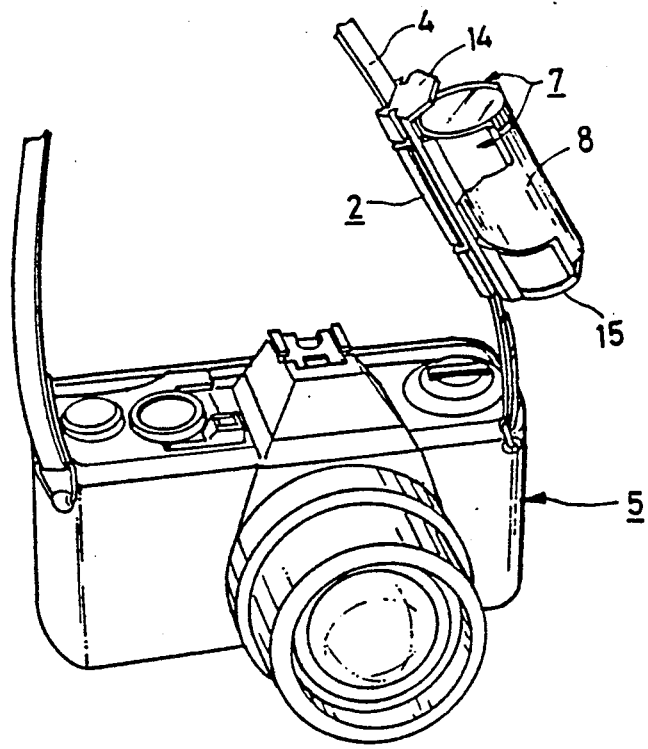
FIG. 4 is a perspective view illustrating schematically how the film case holder is attached to the hand strap of the camera.

Referring to FIGS. 1 and 2, there is shown the construction of a film case holder 1 (hereinafter referred to as "holder") of a first embodiment in accordance with the present invention. In the first embodiment, the holder 1 comprises a holder body 2 extending longitudinally along the axis thereof and having a recess 3 which is formed longitudinally along the rear surface for receiving a hand strap 4 of the pocket camera 5, a fastener 6, which is an elastic member made of steel wire, having a pair of a first and a second leg portions 6a, 6b for securely attaching the holder body 2 to the hand strap 4, and a resilient support member 7 having C-shaped cross section for receiving a film case 8 which receives a film cassette 9 therein.

The holder body 2 is provided with a pair of side grooves 10 which are extending longitudinally and parallel with the recess 3 on the side surface thereof, and a pair of transverse grooves 11 which are located perpendicular to the side grooves 10 and spaced apart in a distance corresponding to the width of the first leg portions 6a of the resilient fastener 6. Each transverse groove 11 is interconnected with the recess 3 and side grooves 10, respectively.

When the fastener 6 is assembled to the holder body 2, the first leg portions 6a thereof are adapted to be inserted into the transverse grooves 11 and the second leg portions 6b thereof are adapted to be inserted into t side grooves 10 of the holder body 2. Accordingly, the holder body 2 is tightly attached to the hand strap 4 through a resilient force of the fastener 6.

The support member 7 is integrally formed with the holder body 2 via a mounting member 12 therebetween. A U-shaped opening 13 is cut away in the intermediate portion of both sides thereof 7 for ease of inserting the film case 8, which receives a film cassette 9 therein, into the inner space of the support member 7 or picking out the film case 8 from the inner space of the support member 7.

A stopper plate 14 is integrally formed on the upper portion of the holder body 2 toward the support member 7 for preventing the film case 8 from dropping out of the inner space of the support member 7. A bottom plate 15 is tightly secured to the lower portion of the support member 7 for housing the film case 8 thereon, so that the film case 8 cannot drop out of the inner space of the support member 7.

Now, we will explain the assembling procedure the film case holder to the hand strap in accordance with the first embodiment of the present invention.

First, we insert the hand strap 4 into the recess formed on the rear surface of the holder body 2, and fit the first leg portions 6a of the faster 6 into the transverse grooves 11 simultaneously with fitting the second leg portions 6a of the fastener 6 into the side grooves 10 of the holder body 2, and then press the first and the second leg portions 6a, 6b of the fastener 6 against above grooves 11, 10 respectively. Therefore, the first and second leg portions 6a, 6b of the fastener 6 are fitted tightly into grooves 11, 10 by means of resilient force of themselves, so that the holder 1 is securely attached to the hand strap 4 of the pocket camera 5.

After that, we insert the film case 8 including the film cassette 9, which is either a used one or a new one, into the inner space of the support member 7. The film case 8 is tightly supported by resilient force of the support member 7 and prevented from dropping out of the inner space thereof, because there are provided with the stopper plate 14 and the bottom plate 16 on the upper and lower portion of the support member 7.

When we pick out the film case 8 out of the support member 7, we grasp the intermediate portion of the film case 8 through the opening 13 and pull out the film case 8 toward outside direction. Therefore, the film case 8 becomes picked out by overcoming resilient force of the support member 7.

Next, when we intend to detach the holder 2 from the hand strap we release the engagement of the 6 with the grooves 10, 11 to separate the holder from the hand strap 4.

Figure 5:
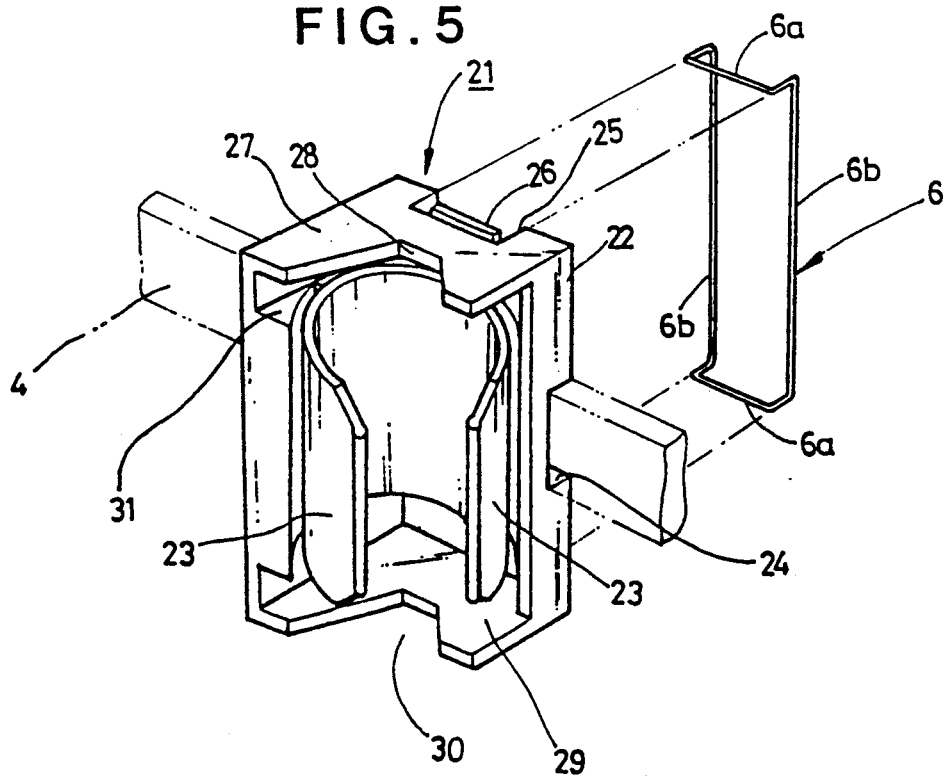
FIG. 5 is a perspective view illustrating the film case holder according to a second embodiment of the present invention.

FIG. 5 is a perspective view showing schematically the film case holder according to a second embodiment of the present invention. In the second embodiment, the holder 21 comprises a box-shaped holder body 22 including an inner space for receiving a support member 23 which is similar to that of the first embodiment, a recess 24 extending transversely on the rear surface of the holder body 22 for receiving the hand strap 4 of the pocket camera 5, a vertical groove 25 extending longitudinally along the axis of the holder body 22 and having a pair of protrusions 26 and 26' (not shown) on the upper and lower portion thereof.

An upper plate 27 having a U-shaped opening 28 is integrally formed on the top of the holder body 22 and a lower plate 29 having a U-shaped opening 30 is formed symmetrically with the upper plate 27 on the bottom of the holder body 22. In the inner space of the holder body 22 is provided with a mounting member 31 similar to that of the first embodiment for supporting the support member 23 which is secured thereon.

In the second embodiment, inserting or releasing operation of the film case 8 is approximately similar to that of the first embodiment, but there is some difference in handling of the film case 8; that is, when we insert or pick out the film case 8, we may grasp the upper and lower portion of the film case 8 with fingers in comparison with grasping the intermediate portion of the film case 8 in the first embodiment.

Meantime, when we intend to assemble the holder 22 to the hand strap 4, we make the hand strap 4 to be inserted into the recess 24 formed on the rear surface of the holder body 22 and locate the fastener 6 onto the vertical groove 25. At this time, we press the first and the second leg portions 6a, 6b of the fastener 6 with the protrusions 26, 26', respectively, so that the fastener 6 is tightly engaged with the protrusions 26, 26' within the vertical groove 25 through the resilient force thereof. Therefore, the hand strap 4 is pressed down within the recess 24 of the holder 22 by the fastener 6, so that the holder 22 is tightly secured to the hand strap 4 not to be loosened.

Since the other handling manners are similar to those of the first embodiment, we will not describe the explanations thereof in details to avoid redundance.

As described above, the film case holder 1, 21 in accordance with the present invention has simple construction and ease of handling. In addition, we may attach a plurality of the film case holders in a desired manner to the hand strap 4, and prevent the film case 8 or film cassette 9 from dropping out to be lost.

It should be appreciated that various modifications will occur to those skilled in the art without departing from the scope and spirit of the invention. For example, the holder 1, 21 may have any other polygonal cross section such as triangle, rectangle, etc.

What is claimed is:

1. A film case holder for a pocket camera for releasably attaching to a hand strap, wherein the film case holder comprises:

a holder body extending longitudinally to the hand strap, having a recess on the rear surface thereof for receiving the hand strap;

a fastener adapted to engage with and securely attach the holder body to the hand strap;

said holder body formed with a resilient support member having a C-shaped cross section for receiving a film case; and wherein said holder body is provided with a pair of side grooves on the side surface and a pair of transverse grooves for receiving said fastener, respectively.

2. A film case holder for pocket camera in accordance with claim 1, wherein said holder body is integrally formed with a stopper plate on the upper portion thereof.

3. A film case holder for pocket camera in accordance with claim 1, wherein said holder body is provided with a bottom plate for closing a lower space of the support member.

* * * * *